United States Patent
Sakadume et al.

(10) Patent No.: US 8,662,316 B2
(45) Date of Patent: Mar. 4, 2014

(54) FILTER MEDIUM FOR LIQUID FILTRATION AND PROCESS FOR PRODUCING THE SAME

(75) Inventors: Nobuyuki Sakadume, Nagaoka (JP); Eiko Meguro, Nagaoka (JP); Toshihiko Soyama, Nagaoka (JP)

(73) Assignee: Hokuetsu Paper Mills, Ltd., Nagaoka-Shi, Niigata (JP)

( * ) Notice: Subject to any disclaimer, the term of this patent is extended or adjusted under 35 U.S.C. 154(b) by 747 days.

(21) Appl. No.: 11/658,072

(22) PCT Filed: Jul. 21, 2004

(86) PCT No.: PCT/JP2004/010681
§ 371 (c)(1),
(2), (4) Date: Oct. 16, 2008

(87) PCT Pub. No.: WO2006/008828
PCT Pub. Date: Jan. 26, 2006

(65) Prior Publication Data
US 2009/0039013 A1   Feb. 12, 2009

(51) Int. Cl.
*B01D 24/00* (2006.01)
*D04H 5/00* (2012.01)

(52) U.S. Cl.
USPC .......... 210/503; 210/767; 162/13; 162/142; 162/149; 162/164.1; 162/157.2; 162/157.6; 162/218; 162/141; 162/30.11; 442/51; 442/54; 442/58; 442/416; 442/327; 442/415

(58) Field of Classification Search
USPC .......... 210/508, 500.27; 442/295.1, 480, 688; 2/508, 500.27
See application file for complete search history.

(56) References Cited

U.S. PATENT DOCUMENTS

| 4,973,382 A * | 11/1990 | Kinn et al. ................ 162/146 |
| 5,272,000 A | 12/1993 | Chenoweth et al. |
| 5,772,846 A | 6/1998 | Jaffee |

FOREIGN PATENT DOCUMENTS

| JP | 56-033507 | 4/1981 |
| JP | 11-165009 A | 6/1999 |
| JP | 2000-70628 A | 3/2000 |
| JP | 2000-336568 | 12/2000 |
| JP | 2000-355898 | 12/2000 |
| JP | 2001-321619 | 11/2001 |
| JP | 02-090047 | 3/2002 |
| JP | 2002-85918 A | 3/2002 |
| JP | 02-258007 | 9/2002 |
| JP | 2003-38918 A | 2/2003 |
| JP | 2004-181341 | 7/2004 |
| JP | 08-192017 | 8/2008 |

* cited by examiner

*Primary Examiner* — Krishnan S Menon
*Assistant Examiner* — Allison Gionta Fitzsimmons
(74) *Attorney, Agent, or Firm* — McCarter & English, LLP

(57) ABSTRACT

A filter medium for liquid filtration of fine texture exhibiting high strength when wetted with water, which filter medium is comprised of a wet-laid nonwoven fabric. There is provided a filter medium for liquid filtration comprised of a wet-laid nonwoven fabric, characterized in that through blending of 0.5 to 40 wt. % of unbeaten natural fibers, it exhibits a very fine texture, a lowering ratio, calculated from bursting strength in ordinary state and bursting strength when wetted with water, of 30% or below, and a bursting strength, had when wetted with water, of 300 kPa or greater.

5 Claims, No Drawings

FILTER MEDIUM FOR LIQUID FILTRATION AND PROCESS FOR PRODUCING THE SAME

This application is a §371 of International Application No.: PCT/JP2004/010681 filed Jul. 21, 2004, which is herein incorporated by reference.

TECHNICAL FIELD

The present invention relates to a filter medium for liquid filtration that separates and captures particulates contained in liquid, and also relates to the production process thereof. To be precise, it relates to a filter medium for obtaining clean liquid by efficiently removing machining swarf contained in processing liquids of wire electrical discharge machines used for metal die sinking, cutting and the like, or machining swarf contained in ultra-pure water used in processes such as cutting, polishing, etching and the like of base wafers in IC production; it also relates to the production process of said filter medium.

BACKGROUND TECHNOLOGY

Conventionally, wire electrical discharge machines are used for metal die sinking, cutting and the like. When processing is carried out in a wire electrical discharge machine, machining swarf are suspended in the processing liquid; in order to remove the machining swarf and separate them from clean liquid, a filter medium unit in which a pleated filter medium is incorporated is set up. In this filter medium unit, a pressure gauge is set up to monitor the pressure of the processing liquid that passes through the filter medium unit. When the pressure of the processing liquid entering the filter medium unit approaches the vicinity of 195 kPa, this pressure gauge sends a signal to the main body of the wire electrical discharge machine, and the operation shuts off automatically to exchange the filter medium unit.

Moreover, when the processing liquid pressure is below 195 kPa, if the filter medium incorporated in the unit cannot withstand the pressure and bursts into the state of being unable to filter the machining swarf, the operation is to shut off automatically.

When the filter medium incorporated in the unit bursts at a pressure of 195 kPa or lower, precision of die sinking declines and an extension of operation time caused by the stoppage of the wire electrical discharge machine occurs resulting in a significant decline in operating efficiency. In order to prevent such problems from occurring, as a required property for the filter medium, bursting strength of 200 kPa or higher when wetted in water for 30 minutes or longer at 30° C. as described in JIS L 1096 is used as an index.

Nevertheless, due to the recent improvement in the performance of wire electrical discharge machines, the pressure of some of the processing liquids rises up to 297 kPa. Consequently, problems with bursting caused by the use of the conventional filter medium have been reported.

Additionally, generally used for processing liquid filter media of wire electrical discharge machines and the like are polyester non-woven fabrics and the like. However, these polyester non-woven fabrics and the like have a high basis weight and a thick sheet thickness. As a result, when pleating is performed and the filter medium is incorporated in a unit, a problem arises that the total filter medium effective area is small.

On the other hand, in the market, while the filter medium basis weight of 110 g/m$^2$~300 g/m$^2$ remains to be the main stream, the tendency is to move toward the direction in which the filter medium is pleated and incorporated in a unit by decreasing the basis weight, and the filter medium life is increased by increasing the total filter medium area. However, decreasing the sheet thickness and lowering the basis weight result in lower bursting strength caused by water wetting. Moreover, when the sheet thickness is decreased while keeping the basis weight as it is, the filter medium becomes very tight; resistance to filtering becomes high and the filter medium life is reduced.

Moreover, generally polyester non-woven fabrics and the like are comprised of heat fused fiber and principal fiber. In this case, although the intersection between the heat fused fiber and the principal fiber which is in contact with the heat fused fiber are bonded, other intersections where the heat fused fiber is absent are not adhered together. Consequently, the strength of non-adhered portions becomes weak resulting in a problem that the total filter medium bursting strength when wetted in water becomes weak.

In order to solve these problems, a proposal on partial thermo-compressional bonding so that bursting strength at the time of water wetting becomes 5.0 kgf/cm$^2$ or higher is made (for instance, Patent Reference 1). However, thermo-compressional bonding gives rise to a shortcoming that filter medium voids collapse to lower the filter efficiency. Moreover, since it is a dry type production process, variations in basis weight are wide, and the filter efficiency fluctuates.

Additionally, a proposal is made to use a filter medium for liquid filtration in which a filter medium is integrated with a backing layer after paper making, and to apply a binder to the backing layer so as to have wet tensile strength in the cross direction of 0.98 kN/m or higher (for example, Patent Reference 2). Nevertheless, applying a binder only to the backing layer renders the filter medium void structure non-uniform; consequently, filtering cannot be done uniformly inside the filter medium, and the initial filter precision fluctuates markedly.

Moreover, when organic synthetic fibers are used to make paper with the wet type paper-making, a proposal is made to employ surface active agents and thickeners to improve the formation (Patent Reference 3). If surface active agents are used, they remain in the sheet; when the sheet is used for a filter medium for liquid filtration, while the sheet wet-ability improves, the strength decreases significantly. At the same time, the surface active agents separate to cause foaming, and affect processing precision tremendously. Moreover, if large quantities of a thickener are used, peeling from paper machine wires is impaired causing sheet non-uniformity and coarseness inside the sheet increases, hence variations in the initial filter precision increase. As the strength is low in the coarse portion, a problem with breakage before reaching a prescribed pressure occurs.

Furthermore, a proposal is also made to coat phenolic resins on polyester non-woven fabrics and the like after drying to increase bursting strength (for example, Patent Reference 4). When phenolic resins are coated, however, mere coating and drying base materials do not increase bursting strength when wetted in water. In order to increase bursting strength when wetted in water, after phenolic resins are coated and dried, usually heat of 100° C. or higher must be applied for several minutes at a separate step. Therefore, an addition of the heat curing process or modification of the existing process is required; hence it takes equipment and much expense in time and effort.

Moreover, a filter medium using fibrilized organic fibers is proposed. If such fibers are used, however, in order to maintain strength in water, the filter medium becomes very tight, resistance to filtering increases and filter medium life becomes short. In order to solve this problem, a pasted two layer structure is used and the thickness of the dense portion is thinned (Patent Reference 5). However, pasting tends to cause interlayer peeling due to poor adhesion and, additionally, an addition of the pasting process and the like or modification is required.

Patent Reference 1: JP 11-165009 A
Patent Reference 2: JP 2003-38918 A
Patent Reference 3: JP 9-155127 A
Patent Reference 4: JP 7-26499 A
Patent Reference 5: JP 4-313313 A

PROBLEMS TO BE SOLVED BY THE INVENTION

The objective of the present invention is to solve the above-mentioned shortcomings and problems of the existing technology; provide a filter medium for liquid filtration superior in filtering characteristics having a very good formation and a small decrease in wet bursting strength; simplify the filter medium for liquid filtration post-processing step; and reduce sharply the cost for addition or modification in manufacturing processes.

MEANS TO SOLVE THE PROBLEMS

The above-mentioned problems of the present invention is solved by a filter medium for liquid filtration characterized by having a 100 g/m² or less basis weight, a 30% or less strength decrease ratio as calculated from the normal state bursting strength and the bursting strength when wetted in water for 30 minutes at 30° C. as described in JIS L 1096.

Furthermore, the present invention also relates to a production process for the above-mentioned filter medium for liquid filtration characterized by the fact that, after a sheet is formed with the wet type paper-making so as to have a 100 g/m² or less basis weight, a synthetic resin binder is applied to this sheet followed by drying.

EFFECTS OF THE PRESENT INVENTION

When a filter medium is pleated to a filter according to the present invention, the number of folded leaves of the filter medium can be increased to increase the filter life, and by bonding all fiber intersections variations in basis weight inside the sheet is reduced while the basis weight is as low as 100 g/m² or less; thus obtainable is a filter medium for liquid filtration superior in filter characteristics in which the sheet formation is good, bursting strength when wetted in water is high, the pore diameter distribution inside the sheet is made uniform and the filtration precision is improved markedly. Moreover, since the filter medium of the present invention has a single layer structure, post-processing during the filter medium production can be simplified, and the cost incurred by an addition, modification and the like of production processes can be reduced significantly.

THE BEST MODE FOR EMBODIMENT OF THE INVENTION

In one of the advantageous modes of embodiment of the present invention, in said filter medium, the value of normalized standard deviation measured with the β-ray formation tester is 0.8 or less.

In one of the advantageous modes of embodiment of the present invention, wet bursting strength in water for 30 minutes is 2.0 kN/m or higher in the machine direction, and 1.0 kN/m or higher in the cross direction, and the ratio of the strength in the machine direction to that in the cross direction is 1.0~4.0.

In one of the advantageous modes of embodiment of the present invention, the filter medium has a single layer structure.

In one of the advantageous mode of embodiment of the present invention, in said filter medium, 0.5~40% by weight of a non-beating natural fiber of 70 μm or less in fiber diameter is contained; as other base materials, contained are an ultrafine organic fiber and ultrafine inorganic fiber of below 5 μm in fiber diameter, and a synthetic organic fiber and inorganic fiber of 5 μm or higher in fiber diameter; part of the synthetic organic fiber of 5 μm or higher in fiber diameter is a fibrous organic binder; and a synthetic resin type binder is applied in the amount of 5~20% by weight with respect to the above-mentioned total base material.

In one of the advantageous mode of embodiment of the present invention, the maximum sheet pore diameter is 10~50 μm and the most frequent pore diameter is 4~30 μm.

In one of the advantageous modes of embodiment of the present invention, the ratio of the maximum filter medium pore diameter to the most frequent pore diameter is 1.0~5.0.

In one of the advantageous modes of embodiment of the present invention, the filter medium density is 0.20~0.40 g/cm³.

The most important factor in the present invention is the filter medium formation. The filter medium formation has a great effect on strength and filtration precision. As a result, controlling is the most important matter. For a measurement device to represent the filter medium formation in terms of numerical value, there is something called formation meter, but only the β-ray formation tester can directly measure variations in basis weight of the measurement point. Moreover, only the β-ray formation tester can also compare formations of filter media having different basis weights. Therefore, relationships between Normalized Standard Deviation (hereinafter, abbreviated as N.S.D.) calculated from this formation tester, and wet bursting strength when wetted in water, uniform pore diameter distribution inside the filter medium and filtration precision were found. That is to say, by setting the N.S.D. calculated from the β-ray formation tester to be 0.8 or less, variations in basis weight inside the filter medium, which is an important factor of the filter medium for liquid filtration, can be reduced; the percentage of decrease of wet bursting strength when wetted in water can be made minimum; the pore diameter distribution inside the filter medium can be made uniform and the filtration precision can be improved.

Not only the bursting strength in water wetting, tensile strength is also an important physical property for the filter medium for liquid filtration. If tensile strength is low, water pressure breaks the filter. Therefore, the filter medium wet tensile strength is preferably 0.2 kN/m or higher in the machine direction, and 1.0 kN/m or higher in the cross direction. However, if the ratio of the strength in the machine direction to that in the cross direction is too large, the decline in bursting strength in water wetting becomes great. Consequently, the ratio of wet tensile strength in the machine direction to that in the cross direction is preferably 1.0~4.0. When the strength in the machine direction to that in the cross direction is smaller than 1.0 or greater than 4.0, the percentage of decrease of wet bursting strength becomes high.

The fine pore diameter distribution inside the filter medium also has a great effect on the performance of the filter medium for liquid filtration. When the fine pore diameter inside the filter medium is too large, and the maximum pore diameter is greater than 50 μm, a decline in the initial filtration precision and decline in strength become significant. Moreover, when it is smaller than 10 µm, while a decline in strength is small, as the fine pore diameter is too small, clogging occurs readily, hence the filter medium life is markedly reduced. When the most frequent pore diameter is greater than 30 µm, the initial filtration precision declines. Moreover, when it is below 4 µm, as the fine pore diameter is small, while the initial filtration is good, clogging occurs readily, hence the filter medium life becomes significantly short. Therefore, it is desirable that the maximum pore diameter inside the sheet be 10~50 µm, the most frequent pore diameter be 4~30 µm, and the ratio of the maximum pore diameter to the most frequent pore diameter be 1.0~5.0. It is more preferably 1.0~3.0. If the ratio of the maximum pore diameter to the most frequent pore diameter is greater than 5.0, the filter medium initial filtration precision declines extremely. Moreover, when this ratio is 1.0, it means that the filter medium has a perfectly uniform fine pore diameter. However, as to this fine pore diameter distribution, it is affected greatly by the value of N.S.D. of the formation. If N.S.D. is greater than 0.8, the ratio of the maximum pore diameter to the most frequent pore diameter becomes greater than 5.0. However, even when the ratio of the maximum pore diameter to the most frequent pore diameter is within the range of 1.0~5.0, a filter unit must be formed with a filter medium having a fine pore diameter distribution matched with the size of particles to be filtered by the filter medium.

For the non-beating natural fiber used in the present invention, cited are natural fibers such as pulp, hemp, cotton linter, cotton lint, straw and the like, and their derivatives; among the natural fibers, pulp and hemp are more preferable. Particularly, for pulp, the softwood pulp of 30~70 µm in average fiber diameter is preferable. In order to maintain bursting strength when wetted in water for 30 minutes at 30° C., and form a good formation without using surface active agents and thickeners, mixing with these natural organic fibers is absolutely essential.

The non-beating natural fiber mixed with the base material must be in the amount of 0.5~40% by weight, preferably 3~30% by weight. If below 0.5% by weight, there is hardly an effect on improving the formation and, if greater than 40% by weight, although the formation is improved, the strength decline in water wetting becomes large.

The fibers other than non-beating natural fibers used in the present invention, and their compositions are described.

For the fibers other than the non-beating natural fibers used in the present invention, it is preferable that the composition be such that, with respect to the sheet basis weight, the amount of an ultra-fine organic fiber and ultra-fine inorganic fiber of below 5 µm in fiber diameter is in the range of 1~60% by weight, that of an organic synthetic fiber and inorganic fiber of 5 µm or higher in fiber diameter is in the range of 10~60% by weight, and the proportion of fibers totals 100%.

For the ultra-fine organic fiber of below 5 µm in fiber diameter used in the present invention, cited are, for example, polyester fibers, PVA fibers, acrylic fibers and the like of below 5 µm.

For the ultra-fine inorganic fiber of below 5 µm in fiber diameter used in the present invention, cited are, for example, glass fibers, carbon fibers, rock fibers, stainless fibers and the like, but glass fibers are preferable.

The mixing ratio of these fibers to the sheet is preferably 1~60% by weight. If below 1% by weight, the percentage of decline of bursting strength is high and, if more than 60% by weight, the pressure loss becomes large and the filter medium life is reduced.

For the organic synthetic fibers of 5 µm or higher in fiber diameter used in the present invention, cited are synthetic fibers such as polyolefin, polyamide, polyester, polyacrylamide, vinylon and the like, and fibrous organic binders.

For the fibrous organic binders of 5 µm in fiber diameter used in the present invention, cited are polyolefin type composite fibers, vinylon binder fibers and the like. When a fibrous organic binder is used alone as a binder, its effect on wet bursting strength is low but if it is used in combination with a liquid, such as latex, solution, emulsion or the like, or viscous synthetic resin type binder, particularly preferably a latex binder, the improvement effect on wet bursting strength is enhanced further.

For the mode of the polyolefin type composite fibers used in the present invention, cited are the core-shell type and side-by-side type, but it is not limited to them. Cited for the representative composite fibers are, for example, a combination of polypropylene (core) and polyethylene (sheath) (Trade name: Daiwabo NBF—H: made by Daiwabo Co., Ltd.), a combination of polypropylene (core) and ethylene vinyl alcohol (sheath) (Trade name: Daiwabo NBF—E: made by Daiwabo Co., Ltd.), a combination of polypropylene (core) and polyethylene (Trade name: Chisso ESC: made by Chisso Corporation), a combination of polyester (core) and polyethylene (sheath) (Trade name: Melty 4080: made by Unitika Limited) and the like.

After the vinylon binder fiber used in the present invention is mixed with other fibers for paper making, the sheet obtained enters the drying step; when the temperature of water held by the sheet reaches the dissolution temperature of the vinylon fiber binder, it adheres to intersections with other fibers mixed, and solidifies as the sheet moisture evaporates to develop strength.

While there is no particular restriction to the fiber diameter of fibrous organic binders, 6~25 µm is preferable. If the fiber diameter is below 6 µm, filter medium pressure loss rises resulting in a short life of the filter. Moreover, if it exceeds 25 µm, since the number of bonded points with other fibers decreases, improvement in wet bursting strength cannot be expected.

Moreover, there is no harm at all in using two types or more of fibrous organic binders having different compositions.

Cited for the inorganic fibers of 5 µm or higher in fiber diameter used in the present invention are glass fibers, carbon fibers, rock fibers, stainless fibers and the like; glass fibers are preferable.

The mixing proportion of these fibers to the sheet is preferably 10~60% by weight. If it is below 10% by weight, as the fiber of below 5 µm in fiber diameter and non-beating natural fibers increase their amounts, although strength increases pressure loss rises. Moreover, if it is more than 60% by weight, as the number of bonded points decreases, strength is to decline.

The filter medium of the present invention has low wet bursting strength at the time of being dried after the wet type paper-making. By applying a binder wet strength can be maintained. For the method for applying a binder, there are several methods such as addition to the raw material prior to the sheet formation, method of impregnation or coating after the sheet formation and the like. In the present invention, in order to improve further bursting strength in water wetting, after the wet type paper-making and sheet formation, a synthetic resin type binder is impregnated or coated.

The binder has a characteristic to bond each intertwinement point of fibers so that the binder penetrates inside the sheet. Especially, when an ultra-fine organic fiber and ultra-fine inorganic fiber of 5 µm or lower in fiber diameter are compounded, since the number of fiber bonded points increases rapidly, wet bursting strength increases synergistically.

As to synthetic resin type binders, a liquid, such as latex, solution, emulsion or the like, or viscous synthetic resin type binder, particularly preferably, a latex binder, for example, acrylic latex, vinyl acetate type latex, urethane type latex, epoxy type latex, SBR latex, NBR latex, olefin type latex or the like, can be used individually or used in combination of two types or more. A binder which has good adhesion to the base material, and whose film degrades little when wetted in water should be chosen.

The amount of the synthetic resin type binder to be imparted to the base material is preferably 5~20% by weight, and more preferably 7~15% by weight. If it is below 5% by weight, pressure loss is low, but no improvement in bursting strength when wetted in water can be expected. Moreover, if it exceeds 20% by weight, although bursting strength when wetted in water increases, pressure loss increases, the filter medium voids become small, and machining swarf clog readily to shorten the filter medium life.

The filter medium of the present invention has good wet bursting strength when a synthetic resin type binder is applied and dried. In order to improve it further depending on applications, a cross-linking agent can be used in combination with the binder.

For the cross-linking agent applied to the filter medium in the present invention, cited are, for example, melamine type cross-linking agents, epoxy type cross-linking agents, isocyanate type cross-linking agents and the like.

The cross-linking agent used in combination with various types of binders is usually added preferably in the amount of 1~10% by weight of solids content of the synthetic resin type binder; more preferably, 3~7% by weight is added. If it is less than 1% by weight, a sufficient cross-link density cannot be attained, whereas even if more than 10% by weight is added, a higher effect cannot be exerted.

The filter medium of the present invention can be produced with paper machines for producing general paper or non-woven fabrics, for example, a wet type paper machine such as the Fourdrinier paper machine, cylinder paper machine, inclined wire type paper machine or the like. For drying, dryers such as the cylinder dryer, through dryer, infrared ray dryer and the like can be used. Moreover, there is no harm at all in using two types or more of dryers to dry the filter medium of the present invention.

The drying temperature, however, is preferably in the range of 80~170° C., more preferably 100~150° C. When it is below 80° C., poor adhesion tends to occur between the base materials and the base material, or between the base material and the synthetic resin type binder, and because the sheet density decreases, the strength declines. Moreover, at a temperature higher than 170° C., since the films of the fibrous organic binder of the base material and synthetic resin type binder increase, and the density and pressure loss rise, the filter medium voids become too small and machining swarf clog easily to reduce the filter medium life.

Additionally, the density of the prepared filter medium must be 0.2~0.4 g/cm$^3$. If it is below 0.2 g/cm$^3$, the percentage of decline of bursting strength when wetted in water increases. Moreover, if it is greater than 0.4 g/cm$^3$, while bursting strength in water wetting increases, pressure loss rises, the filter medium voids become small and machining swarf clog readily to reduce the filter medium life. Moreover, there is nothing wrong with using wet press, heat press after drying or the like on wet paper in order to control the density.

However, it is preferable that it be used so as not to affect the strength and fine pore diameter distribution adversely.

EXAMPLES

The present invention is described concretely herein with reference to examples. However, the present invention is not limited to this. Note that the basis weight, sheet thickness, bursting strength, and bursting strength when wetted in water, tensile strength, and the pore diameter distribution inside the sheet were measured in the following manner.

In the present invention, the basis weight, sheet thickness, density, and bursting strength were measured in accordance with the rule stipulated in JIS L 1096. Note that bursting strength when wetted in water was measured in accordance with the rule stipulated in JIS L 1096; however, the sample was made wet at 30° C. for 30 minutes before measurements were taken. Tensile strength when the filter medium was wetted in water was measured in accordance with the rules stipulated in JIS P 8135 and JIS P 8113; however, the filter medium was made wet in water at 30° C. for 30 minutes before measurements were taken, and the sample had a width of 15 mm and a length of 100 mm. Pressure loss (Pa) was measured in accordance with the rule stipulated in JIS B 9908, and the air resistance to filter was measured at an air flow of 5.3 cm/sec. The pore diameter distribution inside the sheet was measured by using a Palm Porometer made by Porous Materials Inc. in accordance with ASTM F 316-86. N.S.D was calculated using the β-ray formation tester (BFT-1) made by Ambertech Limited.

Computations are shown as follows:

$$N.S.D = STD/(\text{basis weight})^{1/2}$$

where

STD is a standard deviation of mass derived from the basis weight. It can be said that the formation becomes better with decreasing N.S.D.

Example 1

For ultrafine fibers of below 5 μm in diameter, a polyester fiber (TK04N made by Teijin Limited, 0.1 denier×3 mm, about 3.2 μm in diameter) and a glass fiber (#106 made by Johns Manville Company) of about 0.65 μm in diameter, and for fibers of 5 μm or higher, non-beating bleached softwood kraft pulp (hereinafter abbreviated as "NBKP") of about 40 μm in diameter, Vinylon binder fiber (Fibribond 343 made by Kuraray Co., Ltd., 1.0 denier×5 mm, about 10.5 μm in diameter), and a polyester fiber (<131> made by Unitika Limited, 1.0 denier×5 mm) of about 10 μm in diameter were blended at a ratio of 25:15:10:15:35 by weight, respectively. Hence an aqueous slurry was made. This slurry was fed to a paper machine to produce a single layer sheet with a basis weight of 76 g/m$^2$.

When the sheet was wetted in water, a synthetic resin binder was applied by so as to be 13% by weight, and the sheet was dried at 130° C. A filter medium for liquid filtration with a density of 0.290 g/m$^3$ and an N.S.D. of 0.55 was thus obtained. Table 1 shows the measurements results through Comparative Example 4.

For the synthetic resin binder imparted to a wet paper, an acrylic latex (Boncoat SFA-33 made by Dainippon Ink and Chemicals, Inc., hereinafter abbreviated as "synthetic resin binder A") was applied by coating.

Example 2

For ultrafine fibers of below 5 μm in diameter, a polyester fiber (TK04N made by Teijin Limited, 0.1 denier×3 mm, about 3.2 µm in diameter) and a glass fiber (#106 made by Johns Manville Company) of about 0.65 µm in diameter, and for fibers of 5 µm or higher, non-beating NBKP of about 40 µm in diameter, Vinylon binder fiber (Fibribond 343 made by Kuraray Co., Ltd., 1.0 denier×5 mm, about 10.5 µm in diameter), and a polyester fiber (<131> made by Unitika Limited, 1.0 denier×5 mm) of about 10 µm in diameter were blended at a ratio of 10:15:35:15:25 by weight, respectively. Except for the production of aqueous slurry, a filter medium for liquid filtration with a density of 0.310 g/m³ and an N.S.D. of 0.66 was obtained in the same manner as Example 1.

Comparative Example 1

For ultrafine fibers of below 5 µm in diameter, a polyester fiber (TK04N made by Teijin Limited, 0.1 denier×3 mm, about 3.2 µm in diameter) and a glass fiber (#106 made by Johns Manville Company) of about 0.65 µm in diameter, and for fibers of 5 µm or higher, non-beating NBKP of about 40 µm in diameter, Vinylon binder fiber (Fibribond 343 made by Kuraray Co., Ltd., 1.0 denier×5 mm, about 10.5 µm in diameter), and a polyester fiber (<131> made by Unitika Limited, 1.0 denier×5 mm) of about 10 µm in diameter were blended at a ratio of 25:15:10:15:35 by weight, respectively. Hence an aqueous slurry was made. This slurry was fed to a paper machine to produce a single layer sheet with a basis weight of 76 g/m².

Except for the fact that a synthetic resin binder was not used, a filter medium for liquid filtration was obtained in the same manner as Example 1.

Comparative Example 2

For ultrafine fibers of below 5 µm in diameter, a polyester fiber (TK04N made by Teijin, 0.1 denier×3 mm, about 3.2 µm in diameter) and a glass fiber (#106 made by Johns Manville Company) of about 0.65 µm in diameter, and for fibers of 5 µm or higher, non-beating NBKP of about 40 µm in diameter, Vinylon binder fiber (Fibribond 343 made by Kuraray Co., Ltd., 1.0 denier×5 mm, about 10.5 µm in diameter), and a polyester fiber (<131> made by Unitika Limited, 1.0 denier×5 mm, about 10 µm in diameter) were blended at a ratio of 25:15:10:15:35 by weight, respectively. Hence an aqueous slurry was made. This slurry was fed to a paper machine to produce a single layer sheet with a basis weight of 76 g/m².

When the sheet was wetted in water, a synthetic resin binder A was applied so as to be 13% by weight, and the sheet was dried at 50° C. to obtain a filter medium for liquid filtration.

Comparative Example 3

For ultrafine fibers of below 5 µm in diameter, a polyester fiber (TK04N made by Teijin Limited, 0.1 denier×3 mm, about 3.2 µm in diameter) and a glass fiber (#106 made by Johns Manville Company) of about 0.65 µm in diameter, and for fibers of 5 µm or higher, non-beating NBKP of about 40 µm in diameter, Vinylon binder fiber (Fibribond 343 made by Kuraray Co., Ltd., 1.0 denier×5 mm, about 10.5 µm in diameter), and a polyester fiber (<131> made by Unitika Limited, 1.0 denier×5 mm, about 10 µm in diameter) were blended at a ratio of 25:15:10:15:35 by weight, respectively. Hence an aqueous slurry was made. This slurry was fed to a paper machine to produce a single layer sheet with a basis weight of 76 g/m².

When the sheet was wetted in water, a synthetic resin binder A was applied so as to be 13% by weight, and the sheet was dried at 180° C. to obtain a filter medium for liquid filtration.

Comparative Example 4

Except for the fact that the paper machine condition was changed so as to make the wet tensile strength in the machine direction to that in the cross direction be 4.92, the filter medium with a density of 0.330 g/cm³ and an N.S.D. of 0.58 was obtained in the same manner as Example 1.

TABLE 1

| | | Example 1 | Example 2 | Comparative Example 1 | Comparative Example 2 | Comparative Example 3 | Comparative Example 4 |
|---|---|---|---|---|---|---|---|
| Basis weight | g/cm² | 87.0 | 84.0 | 78.0 | 88.3 | 89.1 | 88.3 |
| Paper thickness | mm | 0.300 | 0.271 | 0.312 | 0.491 | 0.141 | 0.268 |
| Density | g/cm³ | 0.290 | 0.310 | 0.250 | 0.180 | 0.630 | 0.330 |
| Pressure loss | Pa | 180.4 | 220.7 | 168.9 | 133.2 | 650.3 | 185.3 |
| Wet tensile strength | Machine direction | 2.79 | 2.00 | 1.23 | 1.63 | 3.51 | 5.66 |
| | Cross direction | 1.30 | 1.40 | 0.45 | 0.66 | 2.05 | 1.15 |
| Machine: Cross direction ratio | | 2.15 | 1.43 | 2.73 | 2.47 | 1.71 | 4.92 |
| Normal state bursting strength | kPa | 453 | 480 | 380 | 302 | 573 | 467 |
| Wet bursting strength | kPa | 381 | 398 | 228 | 157 | 511 | 304 |
| % decline | % | 15.9 | 17.1 | 40.0 | 52.0 | 10.9 | 34.9 |
| N.S.D. | | 0.55 | 0.66 | 0.56 | 0.54 | 0.57 | 0.58 |
| Max pore diameter | µm | 18.1 | 14.1 | 16.1 | 20.1 | 6.5 | 17.9 |

TABLE 1-continued

|  |  | Example 1 | Example 2 | Comparative Example 1 | Comparative Example 2 | Comparative Example 3 | Comparative Example 4 |
|---|---|---|---|---|---|---|---|
| Most frequent pore diameter | μm | 10.2 | 6.9 | 10.1 | 11.6 | 2.7 | 9.9 |
| Max: Most frequent |  | 1.8 | 2.0 | 1.6 | 1.7 | 2.4 | 1.8 |

The filter medium produced in Examples 1 and 2 had a basis weight of 100 g/m$^2$ or less, bursting strength of the filter medium wet in water was 300 kPa or higher, and the percentage decline calculated from the normal state bursting strength and wet bursting strength was 30% or less.

In Comparative Example 1, since synthetic resin binder A was not used at all, wet bursting strength when wetted in water was 300 kPa or less, and the percentage decline calculated from the normal state bursting strength and wet bursting strength was 30% or higher.

Comparative Example 2 uses the same fiber blending ratio and the synthetic resin binder A as Example 1. However, due to the low density of the filter medium, wet bursting strength was 300 kPa or less when wetted in water, and the percentage of decline calculated from the normal state bursting strength and wet bursting strength was 30% or greater.

Comparative Example 3 uses the same fiber blending ratio and the synthetic resin binder A as Example 1. However, due to the low drying temperature and the low density of the filter medium, the wet bursting strength when wetted in water was 300 kPa or higher, and the percentage of decline calculated from the normal state bursting strength and wet bursting strength was 30% or less while the pressure was lost to a great extent.

Comparative Example 4 uses the same fiber blending ratio and the synthetic resin binder A as Example 1. However, since wet tensile strength in the machine direction to that in the cross direction is as large as 4.92, the percentage decline of bursting strength increased to 35%.

Comparative Example 5

For ultrafine fibers of below 5 μm in diameter, a polyester fiber (TK04N made by Teijin Limited, 0.1 denier×3 mm, about 3.2 μm in diameter) and a glass fiber (#106 made by Johns Manville Company) of about 0.65 μm in diameter, and for fibers of 5 μm or higher, Vinylon binder fiber (Fibribond 343 made by Kuraray Co., Ltd., 1.0 denier×5 mm, about 10.5 μm in diameter), and a polyester fiber (<131> made by Unitika Limited, 1.0 denier×5 mm) of about 10 μm in diameter were blended at a ratio of 25:15:15:45 by weight, respectively. Hence the slurry was produced. Except for the fact that the slurry was fed to a paper machine so as to produce a sheet with a basis weight of 76 g/m$^2$, a filter medium for liquid filtration with an N.S.D. of 1.50 was obtained in entirely the same manner as Example 1.

Comparative Example 6

For ultrafine fibers of below 5 μm in diameter, a glass fiber (#106 made by Johns Manville Company) of about 0.65 μm in diameter, and for fibers of 5 μm or higher, non-beating NBKP of about 40 μm in diameter, Vinylon binder fiber (Fibribond 343 made by Kuraray Co., Ltd., 1.0 denier×5 mm, about 10.5 μm in diameter), and a polyester fiber (<131> made by Unitika Limited, 1.0 denier×5 mm) of about 10 μm in diameter were blended at a ratio of 15:60:15:10 by weight, respectively. Hence the slurry was produced. Except for the fact that the slurry was fed to a paper machine so as to produce a sheet with a basis weight of 76 g/m$^2$, a filter medium for liquid filtration with an N.S.D. of 0.43 was obtained in exactly the same manner as Example 1.

TABLE 2

|  |  | Example 1 | Comparative Example 5 | Comparative Example 6 |
|---|---|---|---|---|
| Basis weight | g/m$^2$ | 87.0 | 85.3 | 86.1 |
| Paper thickness | mm | 0.300 | 0.352 | 0.288 |
| Density | g/cm$^3$ | 0.290 | 0.242 | 0.299 |
| Pressure loss | Pa | 180.4 | 143.5 | 483.8 |
| Normal state bursting strength | kPa | 453 | 353 | 401 |
| Wet bursting strength | kPa | 381 | 219 | 120 |
| % decline | % | 15.9 | 38.0 | 70.1 |
| N.S.D. |  | 0.55 | 1.50 | 0.43 |
| Max. pore diameter | μm | 18.1 | 35.6 | 8.0 |
| Most frequent pore diameter | μm | 10.2 | 6.3 | 3.6 |
| Max: Most frequent |  | 1.8 | 5.7 | 2.2 |

Example 1 has an N.S.D of 0.55 and extremely good formation. The wet bursting strength when wetted in water was 300 kPa or higher, and the percentage of decline calculated from the normal state bursting strength and wet bursting strength was 30% or less.

In Comparative Example 5, non-beating natural fiber NBKP was not blended. Due to the inferior formation with a poor N.S.D. of 1.50, wet bursting strength when wetted in water was 300 kPa or less, and the percentage of decline calculated from the normal state bursting strength and wet bursting strength was 30% or greater. Moreover, the ratio of the maximum pore diameter to the most frequent pore diameter increased to 5.7 due to the deterioration of formation.

In Comparative Example 6, although the filter medium had an excellent formation with an N.S.D. of 0.43, non-beating natural fiber NBKP were blended. As a result, wet bursting strength when wetted in water was 300 kPa or less, and the percentage of decline calculated from the normal state bursting strength and wet bursting strength was 30% or greater.

The invention claimed is:
1. A filter medium for liquid filtration having a basis weight of 100 g/cm2 or less, a 30% or less strength decrease ratio as calculated from a normal state bursting strength and bursting strength when in water for 30 minutes at 30° C. as described in JIS L 1096, wet bursting strength of 300 kPa or higher, and a value of the normalized standard deviation as measured with the β-ray formation tester of 0.8 or less, and a filter medium density of 0.20-0.40 g/cm3 wherein said filter medium contains 0.5-40% by weight of a non-beating NBKP of 70 μm or less in fiber diameter; and contains, as other base materials 1-60% by weight of, an ultrafine organic fiber and an ultra-fine inorganic fiber, said ultra-fine fibers being of below 5 µm in fiber diameter, and 10-60% by weight of a synthetic organic fiber and an inorganic fiber, said synthetic organic fiber and inorganic fiber being of 5 µm or higher in fiber diameter and the proportion of fibers total 100%; wherein part of the synthetic organic fiber of 5 µm or higher in fiber diameter is a fibrous organic binder; and wherein a synthetic resin type binder is applied in the amount of 5-20% by weight with respect to the above-mentioned total base materials.

2. The filter medium for liquid filtration as described in claim 1 wherein, in said filter medium, we bursting strength when wetted in water for 30 minutes is 2.0 kN/m or higher in the machine direction, and 1.0 kN/m or higher in the cross direction, and the ratio of the strength in the machine direction to that in the cross direction is 1.0~4.0.

3. The filter medium for liquid filtration as described in claim 1 or 2 wherein, said filter medium has a single layer structure.

4. The filter medium for liquid filtration as descried in claim 1 or 2 wherein, in said filter medium, the maximum pore diameter of said filter medium is 10 µm~50 µm, and the most frequent pore diameter is 4 µm~30 µm.

5. The filter medium for liquid filtration as described in claim 3 wherein, in said filter medium, the maximum pore diameter of said filter medium is 10 µm~50µm, and the most frequent pore diameter is 4 µm~30 µm.

\* \* \* \* \*